US012658195B2

(12) United States Patent
Sharma et al.

(10) Patent No.: US 12,658,195 B2
(45) Date of Patent: Jun. 16, 2026

(54) SYSTEM AND METHOD FOR SECURELY TRANSMITTING VOICE SIGNALS

(71) Applicant: Microsoft Technology Licensing, LLC, Redmond, WA (US)

(72) Inventors: Dushyant Sharma, Mountain View, CA (US); Patrick A. Naylor, Reading (GB); Chandramouli Shama Sastry, Halifax (CA)

(73) Assignee: Microsoft Technology Licensing, LLC., Redmond, WA (US)

( * ) Notice: Subject to any disclaimer, the term of this patent is extended or adjusted under 35 U.S.C. 154(b) by 185 days.

(21) Appl. No.: 18/532,900

(22) Filed: Dec. 7, 2023

(65) Prior Publication Data

US 2025/0191597 A1      Jun. 12, 2025

(51) Int. Cl.
G10L 19/24 (2013.01)
G10L 15/30 (2013.01)
G10L 21/007 (2013.01)

(52) U.S. Cl.
CPC ............ G10L 19/24 (2013.01); G10L 21/007 (2013.01); *G10L 15/30* (2013.01)

(58) Field of Classification Search
CPC ......... G10L 15/26; G10L 19/24; G10L 21/00; G10L 21/003; G10L 21/007; G10L 2021/0135; G10L 15/30; H04L 9/08; G06F 40/40
USPC ..................................... 704/9, 201, 230, 273
See application file for complete search history.

(56) References Cited

U.S. PATENT DOCUMENTS

| | | | |
|---|---|---|---|
| 2015/0067869 A1* | 3/2015 | Krieger | H04L 63/04 726/26 |
| 2021/0335337 A1* | 10/2021 | Gkoulalas-Divanis | G10L 15/26 |
| 2022/0277064 A1* | 9/2022 | Streit | G06V 40/172 |
| 2023/0112622 A1* | 4/2023 | Jun | G06T 1/0028 704/232 |
| 2023/0267372 A1* | 8/2023 | Ravi | G06N 20/00 706/12 |
| 2023/0267936 A1* | 8/2023 | Vair | G06N 3/047 704/232 |
| 2023/0386456 A1* | 11/2023 | Weston | G10L 25/48 |
| 2023/0410789 A1* | 12/2023 | Sharma | G10L 13/033 |
| 2024/0161728 A1* | 5/2024 | Ghosh | G10L 13/047 |
| 2024/0221767 A1* | 7/2024 | Chae | G06F 21/6254 |

(Continued)

OTHER PUBLICATIONS

Fang, Fuming, et al. "Speaker anonymization using x-vector and neural waveform models." arXiv preprint arXiv:1905.13561, May 2019, pp. 1-6. (Year: 2019).*

(Continued)

*Primary Examiner* — James S Wozniak
(74) *Attorney, Agent, or Firm* — Foley IP Law, PLLC

(57) ABSTRACT

A method, computer program product, and computing system for securely transmitting voice signals. A speech signal including a content component and a speaker component of a first voice is received at an encoder. The speaker component of the speech signal is processed, using machine learning, to generate a speaker embedding. The content component of the voice signal is processed, using machine learning and based at least on the speaker embedding, to generate a content embedding having minimized speaker information. The content embedding is transmitted to a decoder for restoring the received speech signal.

18 Claims, 6 Drawing Sheets

452

(56)              References Cited

U.S. PATENT DOCUMENTS

| | | | | |
|---|---|---|---|---|
| 2024/0289491 | A1* | 8/2024 | Zhang | G10L 15/30 |
| 2025/0148078 | A1* | 5/2025 | Lal | G10L 13/027 |
| 2025/0157477 | A1* | 5/2025 | Gaznepoglu | G10L 25/03 |
| 2025/0315631 | A1* | 10/2025 | Waibel | G10L 21/10 |

OTHER PUBLICATIONS

Hu, Yu, et al. "SpeechHide: A hybrid privacy-preserving mechanism for speech content and voiceprint in speech data sharing." 2022 7th IEEE International Conference on Data Science in Cyberspace (DSC). IEEE, Jul. 2022, pp. 345-342. (Year: 2022).*
Kennedy, Sean, et al. "I can hear your alexa: Voice command fingerprinting on smart home speakers." 2019 IEEE Conference on Communications and Network Security (CNS). IEEE, Jun. 2019, pp. 232-240. (Year: 2019).*
Luo, Xinlai, et al. "Encrypted semantic communication using adversarial training for privacy preserving." IEEE Communications Letters 27.6, Sep. 2022, pp. 1-5. (Year: 2022).*
Défossez, et al., "High Fidelity Neural Audio Compression", In Repository of arXiv:2210.13438v1, Oct. 24, 2022, 19 Pages.
Desplanques, et al., "Ecapa-tdnn: Emphasized channel attention, propagation and aggregation in tdnn based speaker verification", In Repository of arXiv:2210.13438v1, Oct. 24, 2022, 5 Pages.
Madras, et al., "Learning Adversarially Fair and Transferable Representations", In Repository of arXiv:1802.06309v3, Oct. 22, 2018, 11 Pages.
Tzeng, et al., "Simultaneous Deep Transfer Across Domains and Tasks", In Repository of arXiv:1510.02192v1, Oct. 8, 2015, pp. 1-9.

* cited by examiner

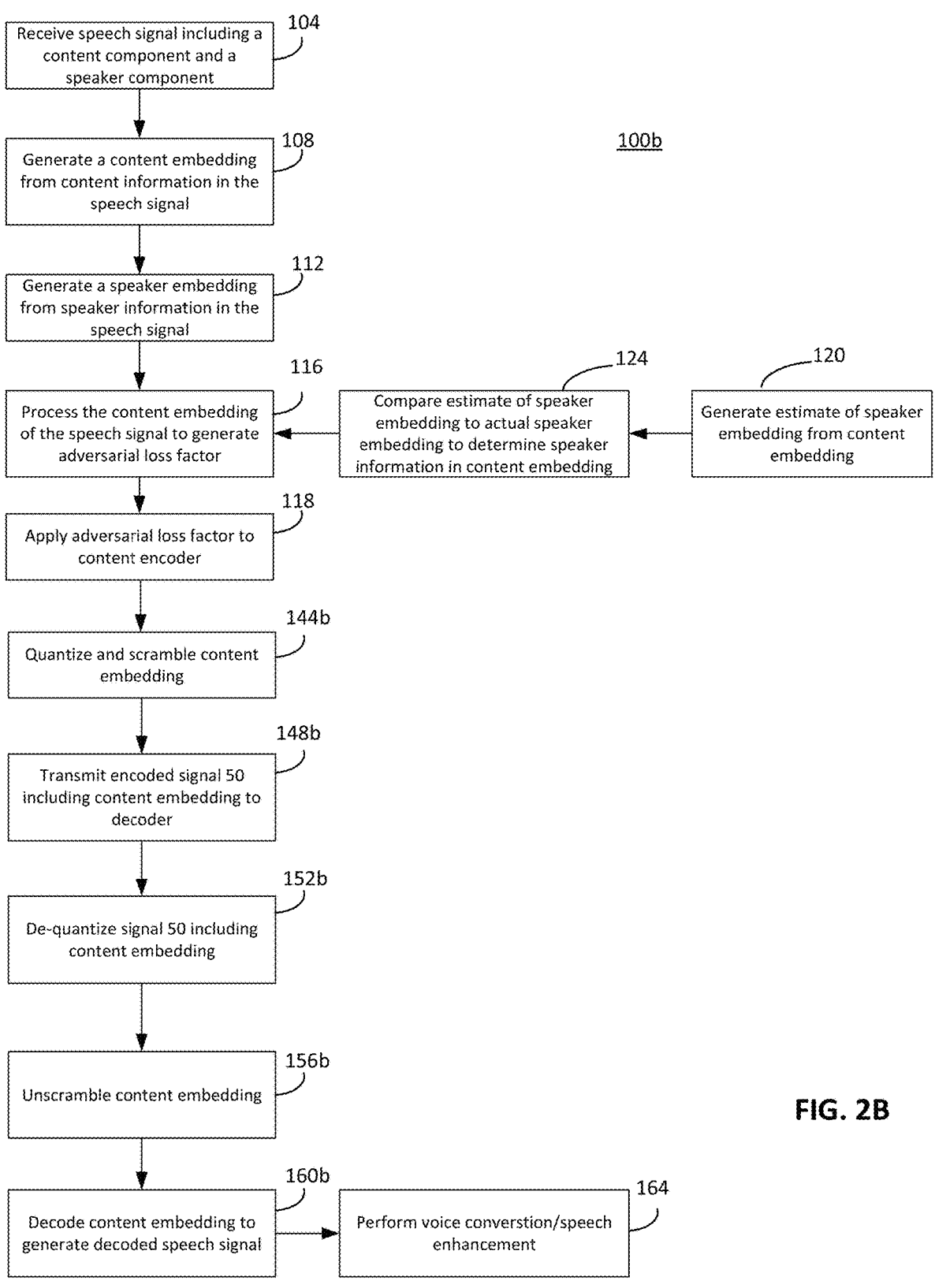

100b

Receive speech signal including a content component and a speaker component — 104

Generate a content embedding from content information in the speech signal — 108

Generate a speaker embedding from speaker information in the speech signal — 112

Process the content embedding of the speech signal to generate adversarial loss factor — 116

Compare estimate of speaker embedding to actual speaker embedding to determine speaker information in content embedding — 124

Generate estimate of speaker embedding from content embedding — 120

Apply adversarial loss factor to content encoder — 118

Quantize and scramble content embedding — 144b

Transmit encoded signal 50 including content embedding to decoder — 148b

De-quantize signal 50 including content embedding — 152b

Unscramble content embedding — 156b

Decode content embedding to generate decoded speech signal — 160b

Perform voice converstion/speech enhancement — 164

FIG. 2B

SYSTEM AND METHOD FOR SECURELY TRANSMITTING VOICE SIGNALS

BACKGROUND

The efficient compression of a voice signal for transmission over a network or radio channel is an important component of modern voice activated interfaces (i.e. smart speakers) and communications software. Current methods for a speech encoder-decoder (CODEC), including neural approaches optimize the ability of the CODEC to efficiently compress the audio signal such that it can be faithfully reconstructed. They do not however consider the voice privacy issue in the design of the CODEC itself. For example, during transmission of a voice signal, the signal can be intercepted and information from the signal can be determined, including not only the content of the signal, but also the identity of the involved parties, since every speaker's voice has certain characteristics that can be used to identify the speaker.

BRIEF DESCRIPTION OF THE DRAWINGS

FIG. 2B is a flow chart of another implementation of the secure voice signal transmission process;

Like reference symbols in the various drawings indicate like elements.

DETAILED DESCRIPTION

Figure 1:
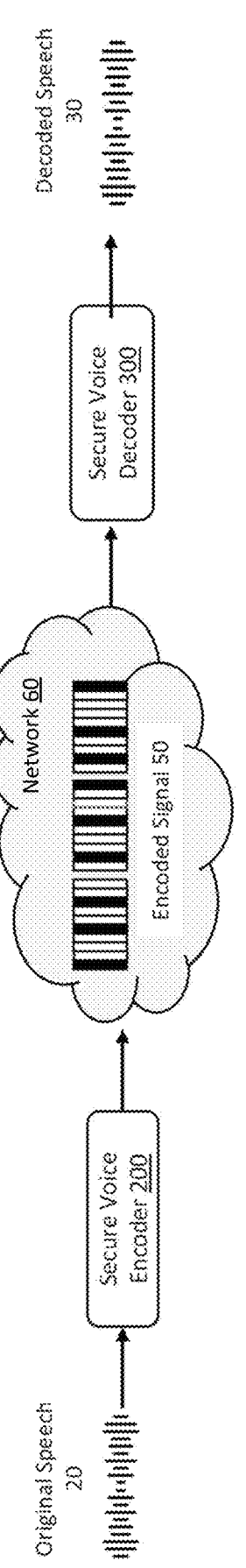
FIG. 1 is a diagrammatic view of an implementation of the secure voice signal transmission process.

As will be discussed in greater detail below, implementations of the present disclosure are directed to processing audio signals to enhance security and privacy of voice transmissions. In this context, two aspects of voice privacy that are contained within a voice signal are addressed, speaker information and content information.

Speaker information is the aspect of a voice signal that identifies a person by the acoustic features (i.e. the voice of the speaker) as determined by factors including pitch and pitch variation, vocal timbre, tempo and other accent-related characteristics. Content information is the aspect of a voice signal that identifies a person by reference to an identifier such as a name, identification number, location data or other personal information including for example financial data, health related data, and culturally or ethnically specific information.

Implementations of the disclosure separate or disentangle speaker information and content information in a voice signal received by an encoder prior to the signal being transmitted to a receiver/decoder. Prior to the transmission, the system encodes the speaker and content information and processes the content information with a form of the speaker information to reduce the amount of speaker information present in the content information. During a training phase, multiple iterations of this processing enable the system to transmit the content information from which speaker information cannot be ascertained. Once trained, the system removes the speaker information such that the identity of the original speaker is hidden. Once the processed voice signal is received at a decoder, the decoder recombines the content information and speaker information to output a representation of the received voice signal. As part of the encoding process, the system is able to manipulate the speaker information portion of the signal to either perform voice conversion as part of the CODEC process, allowing for transmission of speech with either no speaker information (robotic) or in some embodiments, with a specific speaker's voice (i.e another person's or artificially-generated voice) during transmission and then use voice conversion back to the original speaker's voice.

Implementations also include the optional watermarking of speaker information (for applications where such information is needed) and a bit stream scrambling component, controlled by a private key. In an implementation, the watermark may simply be decoded to identify the speaker identity. For example, when doing diarization of a conversation, the watermark may indicate that the current segment is from "Doctor X" and this information may be used as side information. In another implementation the watermarked speaker embedding allows retrieval of the original voice signal via an implicit voice conversion at the decoder. However, a voice conversion may not need to be performed, but the side information from the watermark may be used for other purposes. The scrambler ensures that an intercepted intermediate bit stream is not easily decoded into an intelligible signal. These components therefore ensure speaker and content privacy.

FIG. 1 is a diagrammatic view of a CODEC system according to implementations of the disclosure. An original audio signal, such as voice or speech signal 20, is received at a secure voice encoder 200. As is described in greater detail below, secure voice encoder 200 encodes the content information and speaker information contained in speech signal 200 prior to transmitting the encoded signal 50 over a transmission network 60 to secure voice decoder 300. Voice decoder 300 decodes the encoded signal 50 and outputs a decoded speech signal 30, which is a representation of the received speech signal 20. Transmission network 60 may be any type of transmission network including, but not limited to, Wi-Fi, cellular, Bluetooth, satellite communications, mesh networks, Zigbee and Z-Wave, WiMAX, and near field communication (NFC) networks.

Figure 2A:
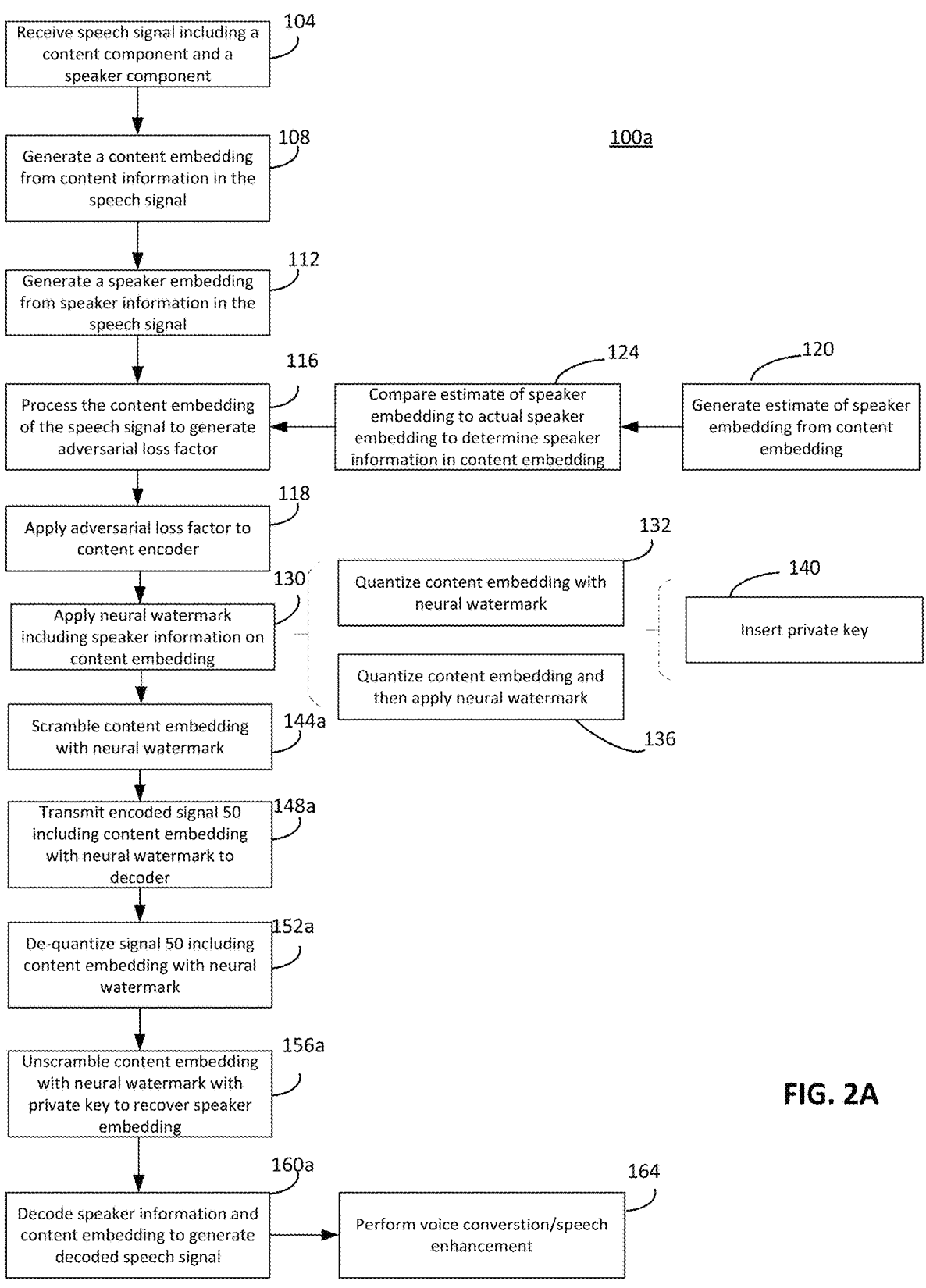
FIG. 2A is a flow chart of one implementation of the secure voice signal transmission process.
Figure 3:
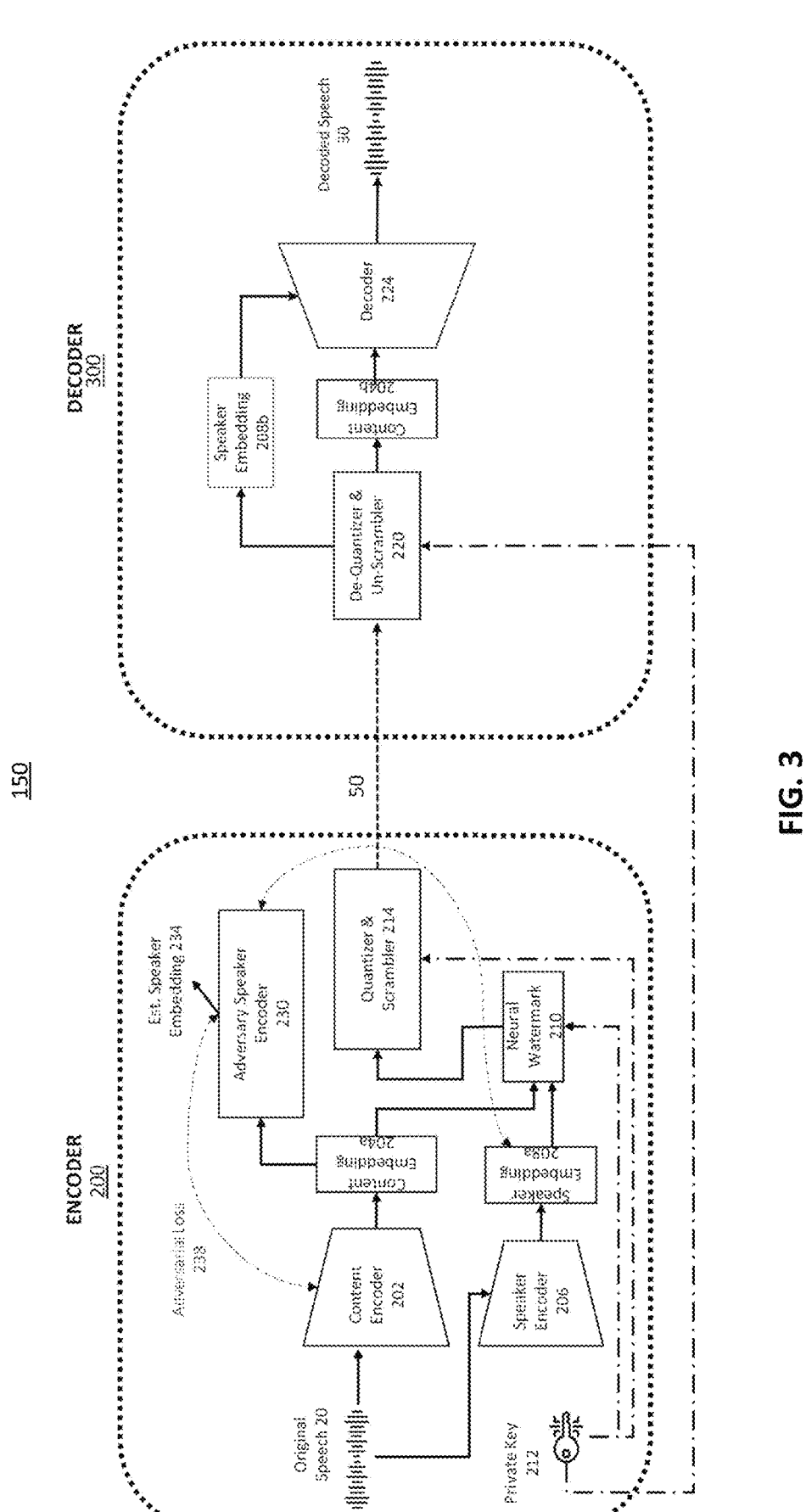
FIG. 3 is a more detailed diagrammatic view of an implementation of the secure voice signal transmission process.

Referring now to FIGS. 2A, 2B, and 3, an implementation of the disclosure will be described. FIG. 2A is a flow chart 100a showing the operation of the secure voice transmission system 150 shown in FIG. 3. As described with reference to FIG. 1, secure voice transmission system 150 includes an encoder 200 for receiving and encoding an input speech signal 20 and decoder 300 for decoding and outputting as the decoded signal 30. Speech signal 20 is received 104 at encoder 200. Signal 20 includes a content information component and a speaker information component. Content encoder 202 receives signal 20 and generates 108, using machine learning, a content embedding 204a from the input signal 20. A content embedding is a compact representation or encapsulation of the intelligible information in the signal. In the context of a voice signal, this is everything that is spoken in the signal, including the speaker information. However, as described below, implementations of the disclosure significantly reduce or remove the speaker information in the content embedding, thus increasing its privacy. In the context of Automatic Speech Recognition (ASR), the content embedding refers to the process of representing spoken language or audio content in a way that captures its semantic and contextual information. It involves converting audio data, typically in the form of speech, into a numerical or vector representation that encodes the meaning and structure of the spoken words. Content embeddings play a crucial role in ASR systems by enabling them to not only transcribe speech into text but also understand the context and semantics of the spoken content. These embeddings are often derived from deep learning techniques, such as recurrent neural networks (RNNs), convolutional neural networks (CNNs), or more advanced architectures like Transformer models. ASR systems use these embeddings to process and analyze speech, which can be further leveraged for various natural language processing tasks like voice assistants, transcription services, and more. Content embeddings are valuable for improving ASR accuracy by capturing the nuances of spoken language, including intonation, pauses, and contextual information, which can be vital for applications like voice search, voice commands, and transcription services. By generating meaningful embeddings, ASR systems can better understand and interpret spoken language, making them more versatile and effective in a wide range of real-world applications.

Speaker encoder 206 receives signal 20 and generates 112 a speaker embedding 208a from the speaker information component of the input signal 20. A speaker embedding in a speech processing system is a compact, fixed-length vector representation that captures the unique characteristics of a speaker's voice. It is a fundamental component in the development of speaker recognition and diarization systems within a speech processing system. The purpose of speaker embeddings is to distinguish and identify different speakers within a stream of audio. These embeddings are generated by deep neural networks, often utilizing architectures like the x-vector or d-vector systems. These neural networks are trained on a large dataset of audio samples and are capable of extracting features that are specific to an individual's voice, such as pitch, tone, and pronunciation patterns. The resulting speaker embeddings can be used to verify the identity of a speaker, segment an audio stream into different speakers (diarization), and improve the accuracy of ASR systems, particularly in scenarios involving multiple speakers.

The content embedding 204a is then processed 116 in adversary speaker encoder 230. Adversary speaker encoder 230 generates an estimate 234 of the speaker embedding from the content embedding 120. In other words, adversarial speaker encoder 230 attempts to extract any speaker information present in the content embedding to generate an estimate 234 of the speaker embedding from the content embedding 204a. As long as there are remnants of speaker information in the content embedding, adversarial speaker encoder may be able to generate the estimated speaker embedding. However, with less speaker information in the content embedding 204a, the distance between the true speaker embedding vector and the estimated embedding 234 will increase accordingly. Once the estimated speaker embedding is generated at 120, the value of the estimate speaker embedding 234 is compared 124 to the actual speaker embedding 208a to generate a loss that corresponds to the distance between the two embeddings. This loss is, for example, the mean square error (MSE) loss factor or Cosine distance referred to here as the adversarial loss factor 238. Other metrics or combinations thereof may be used to represent the adversarial loss factor 238. In an example comparison, when the MSE is equal to zero, the value of the estimate speaker embedding 234 is equal to the speaker embedding 208a. This results in no privacy achieved, since all of the speaker information is still contained in the content embedding. When the value of the estimate speaker embedding 234 is less than the speaker embedding 208a, MSE increases, indicating an increase in privacy, since less (or no) speaker information is contained in the content embedding.

The adversarial loss factor 234 is input to the content encoder 118 to train the content encoder to ignore any speaker information in signal 20 to therefor reduce or eliminate speaker information from the content embedding. As will be understood, decreases in speaker information in the content embedding increases privacy of the speaker information during transmission. A neural watermark is then applied 130 to the content embedding 204a. Neural watermarking is a technique that allows side data to be transmitted with payload data which is encrypted with a private key. In an implementation, the speaker information is "hidden" within the content embedding in the form of the neural watermark in that the speaker information is encoded as side data on the encoded content embedding. A private key 212 is inserted 140 into the signal. In an implementation, the watermarked speaker information allows retrieval of the original voice signal via an implicit voice conversion at the decoder 300. In other implementations, the watermarked speaker information may be used as side information, for example, as input to a speaker verification or diarization system. A private key is used to configure the extraction of speaker information and for unscrambling the encoded signal. In the implementation shown in FIG. 3, content embedding 204a with the neural watermark is quantized after the neural watermark is applied to the content embedding 132. In the implementation that will be described with reference to FIG. 4, the content embedding 204a is quantized before the watermark is applied 136. Once quantized, the content embedding 204a with the neural watermark is scrambled 144a in quantizer/scrambler 214. The quantizer compresses the bit stream for transmission using, for example, vector quantization. The scrambler is a component that scrambles the codebook entries in a pattern dictated by the private key. The scrambler ensures that an intercepted intermediate bit stream is not easily decoded into an intelligible signal. These components therefore ensure acoustic and content privacy. This means that if a bit stream is intercepted during transmission, it will be more difficult to decode it, and even if it is able to be decoded, it would be difficult to decipher the speaker information (since that would require decoding the speaker embedding and then performing a voice conversion).

The quantized and scrambled content embedding with the neural watermark is then transmitted 148a as an encoded signal 50 to decoder 300. Signal 50, including content embedding 204a with the neural watermark containing the speaker information, is de-quantized 152a and then unscrambled 156a, with the use of the private key 212. The resulting content embedding 204b and speaker embedding 208b are then decoded 160a in decoder 224 to generate decoded speech signal 30. Decoded speech signal 30 may then be processed or enhanced 164 at a downstream processor (not shown) . . . . In the way the overall system is trained, it is possible to perform voice conversion as part of the CODEC process, allowing for transmission of speech with either no speaker information (robotic) or in some embodiments, with a specific different speaker's voice during transmission and then voice conversion back to the original speaker's voice. In the way the training data is organized, it is possible to also perform speech enhancement (denoising and de-reverberation) as part of the encoding and decoding process. For example, in the training of the encoder and decoder components, it would be possible to include parallel data, where the encoder is trained to optimize the signal quality by providing noisy, reverberant speech as input and the clean signal as the decoder output. In this manner, the encoder and quantizer have to assign more bits to encoding the clean speech and disregard the interfering signals.

FIG. 2B is a flow chart 100*b* showing another implementation of the operation of the secure voice transmission system 150 shown in FIG. 3. In this implementation, the neural watermark described above is not applied to the content embedding and the speaker information is replaced with a default speaker information set. For example, the speaker information could be replaced with speaker information of a robotic voice for the transmission to the decoder. When received at the encoder, the robotic speaker information may be included in the decoded content embedding as-is, or it can be replaced with speaker information of a different speaker. In FIG. 2B, tasks common with those shown in FIG. 2A are identified with like reference numerals. As described with reference to FIG. 1, secure voice transmission system 150 includes an encoder 200 for receiving and encoding an input speech signal 20 and decoder 300 for decoding and outputting as the decoded signal 30. Speech signal 20 is received 104 at encoder 200. Signal 20 includes a content information component and a speaker information component. Content encoder 202 receives signal 20 and generates 108, using machine learning, a content embedding 204*a* from the input signal 20. A content embedding is a compact representation or encapsulation of the intelligible information in the signal. In the context of a voice signal, this is everything that is spoken in the signal, including the speaker information. However, as described below, implementations of the disclosure significantly reduce or remove the speaker information in the content embedding, thus increasing its privacy. In the context of Automatic Speech Recognition (ASR), the content embedding refers to the process of representing spoken language or audio content in a way that captures its semantic and contextual information. It involves converting audio data, typically in the form of speech, into a numerical or vector representation that encodes the meaning and structure of the spoken words. Content embeddings play a crucial role in ASR systems by enabling them to not only transcribe speech into text but also understand the context and semantics of the spoken content. These embeddings are often derived from deep learning techniques, such as recurrent neural networks (RNNs), convolutional neural networks (CNNs), or more advanced architectures like Transformer models. ASR systems use these embeddings to process and analyze speech, which can be further leveraged for various natural language processing tasks like voice assistants, transcription services, and more. Content embeddings are valuable for improving ASR accuracy by capturing the nuances of spoken language, including intonation, pauses, and contextual information, which can be vital for applications like voice search, voice commands, and transcription services. By generating meaningful embeddings, ASR systems can better understand and interpret spoken language, making them more versatile and effective in a wide range of real-world applications.

Speaker encoder 206 receives signal 20 and generates 112 a speaker embedding 208*a* from the speaker information component of the input signal 20. A speaker embedding in a speech processing system is a compact, fixed-length vector representation that captures the unique characteristics of a speaker's voice. It is a fundamental component in the development of speaker recognition and diarization systems within a speech processing system. The purpose of speaker embeddings is to distinguish and identify different speakers within a stream of audio. These embeddings are generated by deep neural networks, often utilizing architectures like the x-vector or d-vector systems. These neural networks are trained on a large dataset of audio samples and are capable of extracting features that are specific to an individual's voice, such as pitch, tone, and pronunciation patterns. The resulting speaker embeddings can be used to verify the identity of a speaker, segment an audio stream into different speakers (diarization), and improve the accuracy of ASR systems, particularly in scenarios involving multiple speakers.

The content embedding 204*a* is then processed 116 in adversary speaker encoder 230. Adversary speaker encoder 230 generates an estimate 234 of the speaker embedding from the content embedding 120. In other words, adversarial speaker encoder 230 attempts to extract any speaker information present in the content embedding to generate an estimate 234 of the speaker embedding from the content embedding 204*a*. As long as there are remnants of speaker information in the content embedding, adversarial speaker encoder may be able to generate the estimated speaker embedding. However, with less speaker information in the content embedding 204*a*, the distance between the true speaker embedding vector and the estimated embedding 234 will increase accordingly. Once the estimated speaker embedding is generated at 120, the value of the estimate speaker embedding 234 is compared 124 to the actual speaker embedding 208*a* to generate a loss that corresponds to the distance between the two embeddings. This loss is, for example, the mean square error (MSE) loss factor or Cosine distance referred to here as the adversarial loss factor 238. Other metrics or combinations thereof may be used to represent the adversarial loss factor 238. In an example comparison, when the MSE is equal to zero, the value of the estimate speaker embedding 234 is equal to the speaker embedding 208*a*. This results in no privacy achieved, since all of the speaker information is still contained in the content embedding. When the value of the estimate speaker embedding 234 is less than the speaker embedding 208*a*, MSE increases, indicating an increase in privacy, since less (or no) speaker information is contained in the content embedding.

The adversarial loss factor 234 is input to the content encoder 118 to train the content encoder to ignore any speaker information in signal 20 to therefor reduce or eliminate speaker information from the content embedding. As will be understood, decreases in speaker information in the content embedding increases privacy of the speaker information during transmission. The content embedding 204*a* is then quantized and scrambled 144*b* in quantizer/scrambler 214. The quantizer compresses the bit stream for transmission using, for example, vector quantization. The scrambler ensures that an intercepted intermediate bit stream is not easily decoded into an intelligible signal. These components therefore ensure acoustic and content privacy. This means that if a bit stream is intercepted during transmission, it will be more difficult to decode it.

The quantized and scrambled content embedding is then transmitted 148*b* as an encoded signal 50 to decoder 300. Signal 50, including content embedding 204*a* with the neural watermark containing the speaker information, is de-quantized 152*b* and then unscrambled 156*b*, with the use of the private key 212. The resulting content embedding 204*b* is then decoded 160*b* in decoder 224 to generate decoded speech signal 30. Decoded speech signal 30 may then be processed or enhanced 164 at a downstream processor (not shown).

Figure 4:
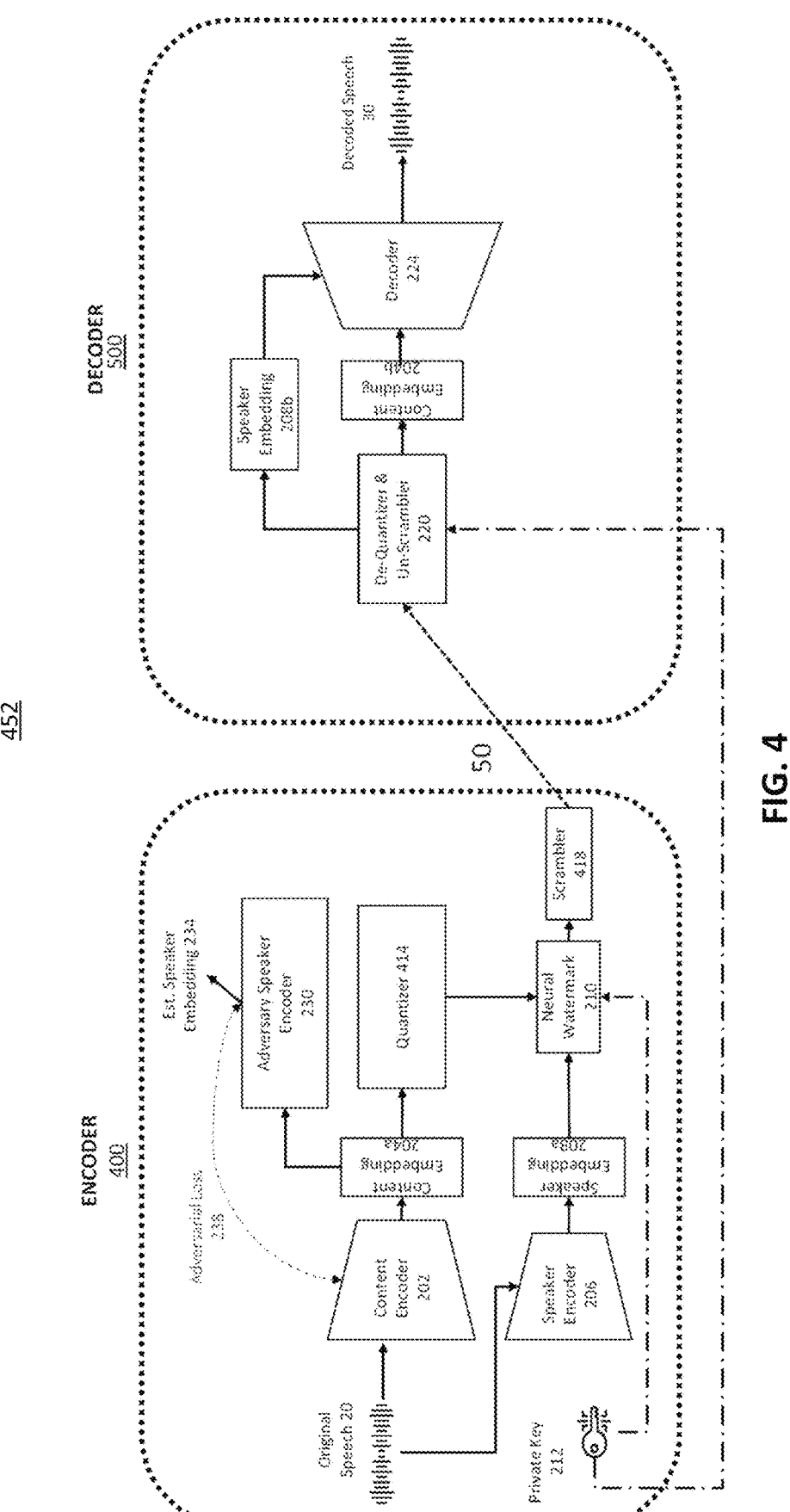
FIG. 4 is a diagrammatic view of another implementation of the secure voice signal transmission process.

FIG. 4 is a diagrammatic view of another implementation of the disclosure. As described above, secure voice transmission system 452 includes an encoder 400 and a decoder 500 for receiving a speech signal 20, encoding it, transmitting it, and then decoding it to output a decoded speech signal 30. Components labeled with reference numerals identical to those of FIG. 3 are identical components that operate in the same way as described with reference to secure voice transmission system 150 of FIG. 3. However, in system 452, rather than both the content embedding 204*a* and speaker embedding 208*a* having the neural watermark applied prior to the quantizer and scrambler 214, the content embedding is quantized in quantizer 414 prior to having the neural watermark 210 applied. The content embedding is scrambled in scrambler 418 before being transmitted as encoded signal 50 to decoder 400.

As described above, implementations of the disclosure enable voice signals to be securely transmitted in a CODEC process in which speaker information from the signal is separated from content information of the signal. Content encoder 202 is trained to remove speaker information in the signal when generating content embeddings. This enables the speaker information to be transmitted securely and privately and then recombined with the content information at decoder 300. In the way the overall system is trained, it is possible to perform voice conversion as part of the CODEC process, allowing for transmission of speech with either no speaker information (robotic) or in some embodiments, with a specific different speaker's voice during transmission and then voice conversion back to the original speaker's voice. The system can also perform speech enhancement (denoising and de-reverberation) as part of the encoding and decoding process. For example, in the training of the encoder and decoder components, the system can include parallel data, where the encoder is trained to optimize the signal quality by providing noisy, reverberant speech as input and the clean signal as the decoder output. In this manner, the encoder and quantizer have to assign more bits to encoding the clean speech and disregard the interfering signals. While the neural watermark process is shown and described with reference to FIGS. 2-4, it will be understood that the watermark process may be optional or only applied when higher security is required.

System Overview

Figure 5:
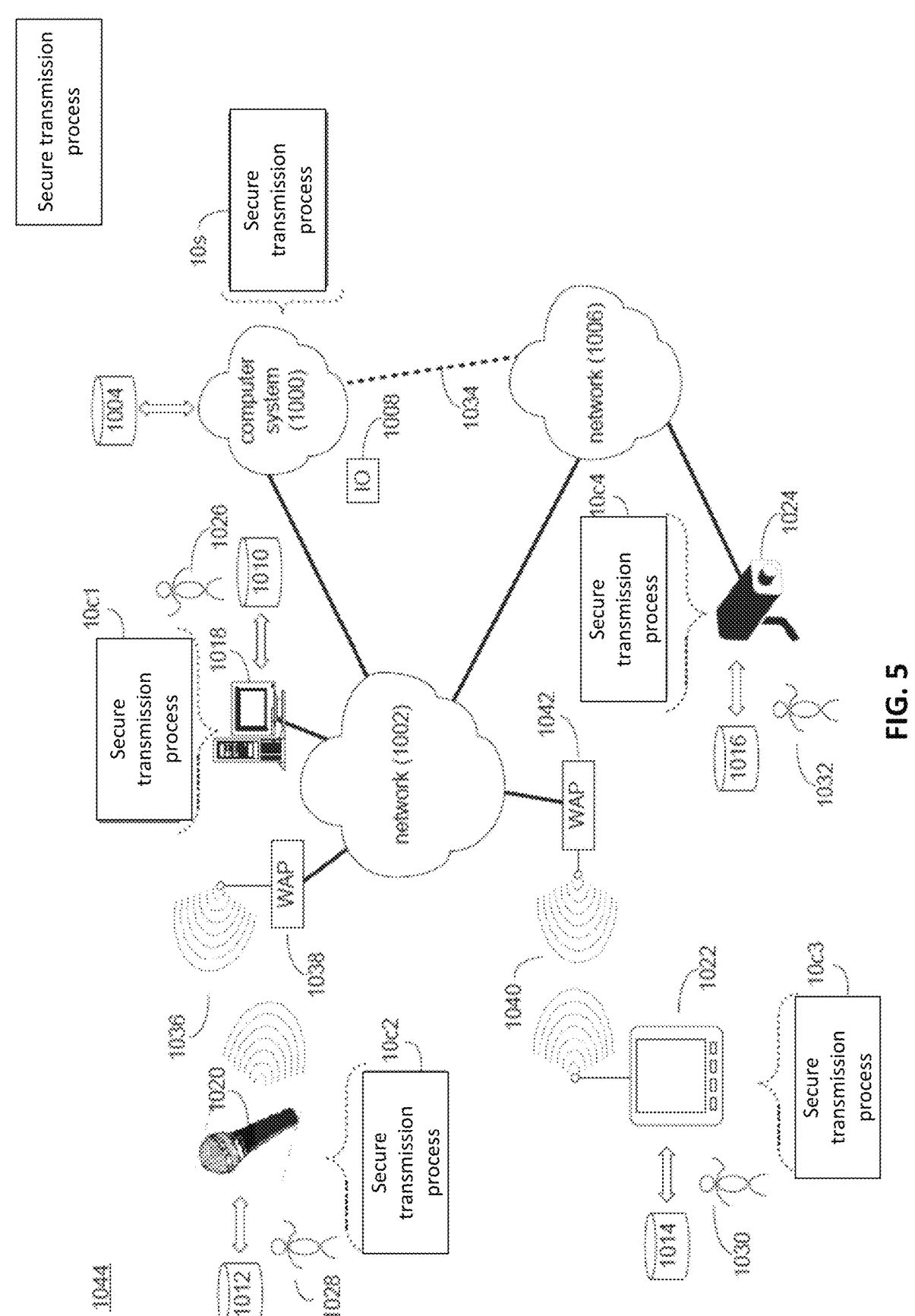
FIG. 5 is a diagrammatic view of a computer system and the secure voice signal transmission process coupled to a distributed computing network.

Referring to FIG. 5, there is shown a secure transmission process 10. Secure transmission process 10 may be implemented as a server-side process, a client-side process, or a hybrid server-side/client-side process. For example, secure transmission process 10 may be implemented as a purely server-side process via computational cost reduction process 10*s*. Alternatively, secure transmission process 10 may be implemented as a purely client-side process via one or more of secure transmission process 10*c*1, secure transmission process 10*c*2, secure transmission process 10*c*3, and secure transmission process 10*c*4. Alternatively still, secure transmission process 10 may be implemented as a hybrid server-side/client-side process via secure transmission process 10*s* in combination with one or more of secure transmission process 10*c*1, secure transmission process 10*c*2, secure transmission process 10*c*3, and secure transmission process 10*c*4.

Accordingly, secure transmission process 10 as used in this disclosure may include any combination of secure transmission process 10*s*, secure transmission process 10*c*1, secure transmission process 10*c*2, secure transmission process 10*c*3, and secure transmission process 10*c*4.

Secure transmission process 10*s* may be a server application and may reside on and may be executed by a computer system 1000, which may be connected to network 1002 (e.g., the Internet or a local area network). Computer system 1000 may include various components, examples of which may include but are not limited to: a personal computer, a server computer, a series of server computers, a mini computer, a mainframe computer, one or more Network Attached Storage (NAS) systems, one or more Storage Area Network (SAN) systems, one or more Platform as a Service (PaaS) systems, one or more Infrastructure as a Service (IaaS) systems, one or more Software as a Service (SaaS) systems, a cloud-based computational system, and a cloud-based storage platform.

A SAN includes one or more of a personal computer, a server computer, a series of server computers, a minicomputer, a mainframe computer, a RAID device and a NAS system. The various components of computer system 1000 may execute one or more operating systems.

The instruction sets and subroutines of computational cost reduction process 10*s*, which may be stored on storage device 1004 coupled to computer system 1000, may be executed by one or more processors (not shown) and one or more memory architectures (not shown) included within computer system 1000. Examples of storage device 1004 may include but are not limited to: a hard disk drive; a RAID device; a random-access memory (RAM); a read-only memory (ROM); and all forms of flash memory storage devices.

Network 1002 may be connected to one or more secondary networks (e.g., network 1004), examples of which may include but are not limited to: a local area network; a wide area network; or an intranet, for example.

Various IO requests (e.g., IO request 1008) may be sent from secure transmission process 10*s*, secure transmission process 10*c*1, secure transmission process 10*c*2, secure transmission process 10*c*3 and/or secure transmission process 10*c*4 to computer system 1000. Examples of IO request 1008 may include but are not limited to data write requests (i.e., a request that content be written to computer system 1000) and data read requests (i.e., a request that content be read from computer system 1000).

The instruction sets and subroutines of secure transmission process 10*c*1, secure transmission process 10*c*2, secure transmission process 10*c*3 and/or computational cost reduction process 10*c*4, which may be stored on storage devices 1010, 1012, 1014, 1016 (respectively) coupled to client electronic devices 1018, 1020, 1022, 1024 (respectively), may be executed by one or more processors (not shown) and one or more memory architectures (not shown) incorporated into client electronic devices 1018, 1020, 1022, 1024 (respectively). Storage devices 1010, 1012, 1014, 1016 may include but are not limited to: hard disk drives; optical drives; RAID devices; random access memories (RAM); read-only memories (ROM), and all forms of flash memory storage devices. Examples of client electronic devices 1018, 1020, 1022, 1024 may include, but are not limited to, personal computing device 1018 (e.g., a smart phone, a personal digital assistant, a laptop computer, a notebook computer, and a desktop computer), audio input device 1020 (e.g., a handheld microphone, a lapel microphone, an embedded microphone (such as those embedded within eyeglasses, smart phones, tablet computers and/or watches) and an audio recording device), display device 1022 (e.g., a tablet computer, a computer monitor, and a smart television), a hybrid device (e.g., a single device that includes the functionality of one or more of the above-references devices; not shown), an audio rendering device (e.g., a speaker system, a headphone system, or an earbud system; not shown), and a dedicated network device (not shown).

Users 1026, 1028, 1030, 1032 may access computer system 1000 directly through network 1002 or through secondary network 1006. Further, computer system 1000 may be connected to network 1002 through secondary network 1006, as illustrated with link line 1034.

The various client electronic devices (e.g., client electronic devices 1018, 1020, 1022, 1024) may be directly or indirectly coupled to network 1002 (or network 1006). For example, personal computing device 1018 is shown directly coupled to network 1002 via a hardwired network connection. Further, machine vision input device 1024 is shown directly coupled to network 1006 via a hardwired network connection. Audio input device 1022 is shown wirelessly coupled to network 1002 via wireless communication channel 1036 established between audio input device 1020 and wireless access point (i.e., WAP) 1038, which is shown directly coupled to network 1002. WAP 1038 may be, for example, an IEEE 802.11a, 802.11b, 802.11g, 802.11n, Wi-Fi, and/or any device that is capable of establishing wireless communication channel 1036 between audio input device 1020 and WAP 1038. Display device 1022 is shown wirelessly coupled to network 1002 via wireless communication channel 1040 established between display device 1022 and WAP 1042, which is shown directly coupled to network 1002.

The various client electronic devices (e.g., client electronic devices 1018, 1020, 1022, 1024) may each execute an operating system, wherein the combination of the various client electronic devices (e.g., client electronic devices 1018, 1020, 1022, 1024) and computer system 1000 may form modular system 1044.

General

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be used. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object-oriented programming language. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet.

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general-purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, not at all, or in any combination with any other flowcharts depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:

receiving, by an encoder, a speech signal including speaker information of a speaker, the encoder including a neural network for encoding speech signals into content embeddings for secure transmission over a communications network to a remote automatic speech recognition (ASR) system;

training, over multiple iterations, the neural network to encode the speech signal into a content embedding that includes a minimal amount of the speaker information, wherein training the neural network includes encoding, by the neural network during each of the multiple iterations, the speech signal into a corresponding version of the content embedding based on an adversarial loss factor, wherein the adversarial loss factor represents a difference between a speaker embedding generated from the speech signal and an estimated speaker embedding representing remnants of the speaker information extracted from a most recent version of the content embedding, and wherein the neural network is trained to encode the speech signal so as to increase the adversarial loss factor over the multiple iterations;

encoding, by the trained neural network, a subsequent speech signal into a subsequent content embedding; and transmitting an encoded signal that includes the subsequent content embedding over the communications network to the remote ASR system.

2. The computer-implemented method of claim 1, further comprising generating the speaker embedding.

3. The computer-implemented method of claim 2, further comprising generating the estimated speaker embedding during each of the multiple iterations.

4. The computer-implemented method of claim 3, further comprising comparing the speaker embedding with the estimated speaker embedding during each of the multiple iterations to determine the adversarial loss factor.

5. The computer-implemented method of claim 1, further comprising quantizing the subsequent content embedding prior to transmitting the encoded signal over the communications network.

6. The computer-implemented method of claim 1, further comprising scrambling the subsequent content embedding prior to transmitting the encoded signal over the communications network.

7. The computer-implemented method of claim 1, further comprising applying a neural watermark to the subsequent content embedding prior to transmitting the encoded signal over the communications network, the neural watermark including subsequent speaker information from the subsequent speech signal.

8. A computing system comprising:

a processor; and a memory storing programming instructions for execution by the processor, the programming instructions, upon execution by the processor, causing the computing system to perform the following operations:

receiving, by an encoder, a speech signal including speaker information of a speaker, the encoder including a neural network for encoding speech signals into content embeddings for secure transmission over a communications network to a remote automatic speech recognition (ASR) system;

training, over multiple iterations, the neural network to encode the speech signal into a content embedding that includes a minimal amount of the speaker information, wherein training the neural network includes encoding, by the neural network during each of the multiple iterations, the speech signal into a corresponding version of the content embedding based on an adversarial loss factor, wherein the adversarial loss factor represents a difference between a speaker embedding generated from the speech signal and an estimated speaker embedding representing remnants of the speaker information extracted from a most recent version of the content embedding, and wherein the neural network is trained to encode the speech signal so as to increase the adversarial loss factor over the multiple iterations;

encoding, by the trained neural network, a subsequent speech signal into a subsequent content embedding; and transmitting an encoded signal that includes the subsequent content embedding over the communications network to the remote ASR system.

9. The computing system of claim 8, wherein the programming instructions further cause the computing system to perform the following operations:

generating the speaker embedding; and generating the estimated speaker embedding during each of the multiple iterations.

10. The computing system of claim 9, wherein the programming instructions further cause the computing system to perform the following operation:

comparing the speaker embedding with the estimated speaker embedding during each of the multiple iterations to determine the adversarial loss factor.

11. The computing system of claim 8, wherein the programming instructions further cause the computing system to perform the following operation:

quantizing the subsequent content embedding prior to transmitting the encoded signal over the communications network.

12. A computer program product residing on a non-transitory computer readable medium having programming instructions stored thereon which, when executed by a processor of a system, cause the system to perform the following operations:

receiving, by an encoder, a speech signal including speaker information of a speaker, the encoder including a neural network for encoding speech signals into content embeddings for secure transmission over a communications network to a remote automatic speech recognition (ASR) system;

training, over multiple iterations, the neural network to encode the speech signal into a content embedding that includes a minimal amount of the speaker information, wherein training the neural network includes encoding, by the neural network during each of the multiple iterations, the speech signal into a corresponding version of the content embedding based on an adversarial loss factor, wherein the adversarial loss factor represents a difference between a speaker embedding generated from the speech signal and an estimated speaker embedding representing remnants of the speaker information extracted from a most recent version of the content embedding, and wherein the neural network is trained to encode the speech signal so as to increase the adversarial loss factor over the multiple iterations;

encoding, by the trained neural network, a subsequent speech signal into a subsequent content embedding; and transmitting an encoded signal that includes the subsequent content embedding over the communications network to the remote ASR system.

13. The computer program product of claim 12, wherein the programming instructions further cause the system to perform the following operation:

generating the speaker embedding.

14. The computer program product of claim 13, wherein the programming instructions further cause the system to perform the following operation:

generating the estimated speaker embedding during each of the multiple iterations.

15. The computer program product of claim 14, wherein the programming instructions further cause the system to perform the following operation:

comparing the speaker embedding with the estimated speaker embedding during each of the multiple iterations to determine the adversarial loss factor.

16. The computer program product of claim 12, wherein the programming instructions further cause the system to perform the following operation:

quantizing the subsequent content embedding prior to transmitting the encoded signal over the communications network.

17. The computer program product of claim 12, wherein the programming instructions further cause the system to perform the following operation:

scrambling the subsequent content embedding prior to transmitting the encoded signal over the communications network.

18. The computer program product of claim 12, wherein the programming instructions further cause the system to perform the following operation:

applying a neural watermark to the subsequent content embedding prior to transmitting the encoded signal over the communications network, the neural watermark including subsequent speaker information from the subsequent speech signal.

* * * * *